United States Patent
Liu et al.

(10) Patent No.: US 9,520,148 B1
(45) Date of Patent: Dec. 13, 2016

(54) RESET OF MAGNETIC DOMAINS IN WRITE HEAD VIA EXTERNAL FIELD

(71) Applicant: Seagate Technology LLC, Cupertino, CA (US)

(72) Inventors: Yanzhang Liu, Eden Prairie, MN (US); Kirill Rivkin, Edina, MN (US); Lei Lu, Bloomington, MN (US); Huaqing Yin, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/976,286

(22) Filed: Dec. 21, 2015

(51) Int. Cl.
*G11B 5/02* (2006.01)
*G11B 5/33* (2006.01)
*G11B 5/465* (2006.01)
*H01F 13/00* (2006.01)
*G11B 5/127* (2006.01)
*G11B 5/60* (2006.01)

(52) U.S. Cl.
CPC .............. *G11B 5/465* (2013.01); *G11B 5/127* (2013.01); *G11B 5/6005* (2013.01); *H01F 13/006* (2013.01)

(58) Field of Classification Search
CPC .............. G11B 2005/0021; G11B 2005/0005; G11B 5/314; G11B 5/3903; G11B 25/00; G11B 5/6005; G11B 5/465; G11B 5/127
USPC .... 360/328, 324, 313, 59; 369/13.33, 13.14, 369/13.17, 13.15
See application file for complete search history.

(56) References Cited

U.S. PATENT DOCUMENTS

| | | | |
|---|---|---|---|
| 4,471,403 A | 9/1984 | Dress, Jr. et al. | |
| 5,815,342 A | 9/1998 | Akiyama et al. | |
| 7,088,537 B2 | 8/2006 | Cronch et al. | |
| 7,372,653 B2 | 5/2008 | Suzuki et al. | |
| 7,411,756 B2 | 8/2008 | Wilson et al. | |
| 8,564,910 B2 | 10/2013 | Benakli et al. | |
| 9,177,574 B2 * | 11/2015 | Fuji ........................ | B82Y 25/00 |
| 2006/0061913 A1 | 3/2006 | Sekiguchi et al. | |
| 2008/0013245 A1 | 1/2008 | Schultz et al. | |
| 2010/0118432 A1 | 5/2010 | Shibano | |
| 2011/0228423 A1 | 9/2011 | Koui et al. | |

* cited by examiner

*Primary Examiner* — Nabil Hindi
(74) *Attorney, Agent, or Firm* — Holzer Patel Drennan

(57) ABSTRACT

Methods of removing a magnetic domain from a slider structure, such as a shield in a write head, in a data storage assembly. The method comprises passing the slider structure in close proximity to a decaying magnetic field of at least 100 Oe and no more than 1500 Oe originating from within the storage assembly. In some implementations the decaying magnetic field has an oscillating polarity.

20 Claims, 10 Drawing Sheets

Inset A

RESET OF MAGNETIC DOMAINS IN WRITE HEAD VIA EXTERNAL FIELD

BACKGROUND

In a magnetic data storage and retrieval system, a magnetic read/write head typically includes a writer portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc Unfortunately, these data storage devices often experience specific errors and failure modes due to an undesired magnetic flux originating from a location of the read/write head. It is not uncommon for a magnetic domain, or domain wall (DW), to form in shield(s) of the read/write head. This phenomenon can dynamically vary during various operations conducted by the read/write head and result in sporadic and inconsistent reading and/or writing failures. For example, a DW can cause magnetic flux writing and/or erasing of information contained on media in an undesirable and often uncontrollable manner. Additionally and alternately, if a DW is close to the read head itself, the magnetic field caused by the DW itself can directly affect the accuracy of the readout.

Prior to being assembled into the data storage device, domain walls are removed from the read/write head. However, during use of the data storage device, it is not uncommon for domain walls to reform and reappear.

SUMMARY

In general, this disclosure is directed to methods to set (reset) a write head magnetization after it has been incorporated into a data storage assembly.

One particular implementation described herein is a method of removing a magnetic domain from a slider structure in a data storage assembly. The method comprises passing the slider structure in close proximity to a decaying magnetic field of at least 100 Oe and no more than 1500 Oe originating from within the storage assembly.

Another particular implementation is a method of removing a magnetic domain from a shield of a write head. The method comprises exposing the write head to a magnetic field oscillating between at least +100 Oe and −100 Oe and no more than +1500 Oe and −1500 Oe.

Yet another particular implementation described herein is a magnetic data storage assembly comprising an enclosure, a slider having a write head, and a magnetic field source in the enclosure, the source configured to provide a decaying magnetic field oscillating between at least +100 Oe and −100 Oe and no more than +1500 Oe and −1500 Oe.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

FIG. 1 is a top view of an example data storage assembly, including a magnetic field generator.

FIG. 2A is a schematic cross-sectional side view of an example write head; FIG. 2B is a schematic cross-sectional top view of the example write head, taken along the line B-B of FIG. 2A; FIG. 2C is a schematic air-bearing surface (ABS) plan view of the example write head.

DETAILED DESCRIPTION

As discussed above, memory or data storage assemblies, such as disc drive assemblies, include a slider that has a write head (or write sensor or write transducer or merely writer) and a read head (or read sensor or read transducer or merely reader) that is designed and configured to glide on an air bearing over a magnetic media, such as a magnetic data storage disc.

This disclosure is directed to apparatus configurations and methods to set (reset) a write head magnetization using a decaying and optionally oscillating magnetic field, after the write head has been incorporated into a data storage assembly. The devices and methods of this disclosure provide for removal of domain walls in the writer shield(s) (e.g., trailing shield, side shields) during operational use of the writer, for example, during a maintenance mode, which may between read/write operations or e.g., scheduled during known down times, such as the middle of the night.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
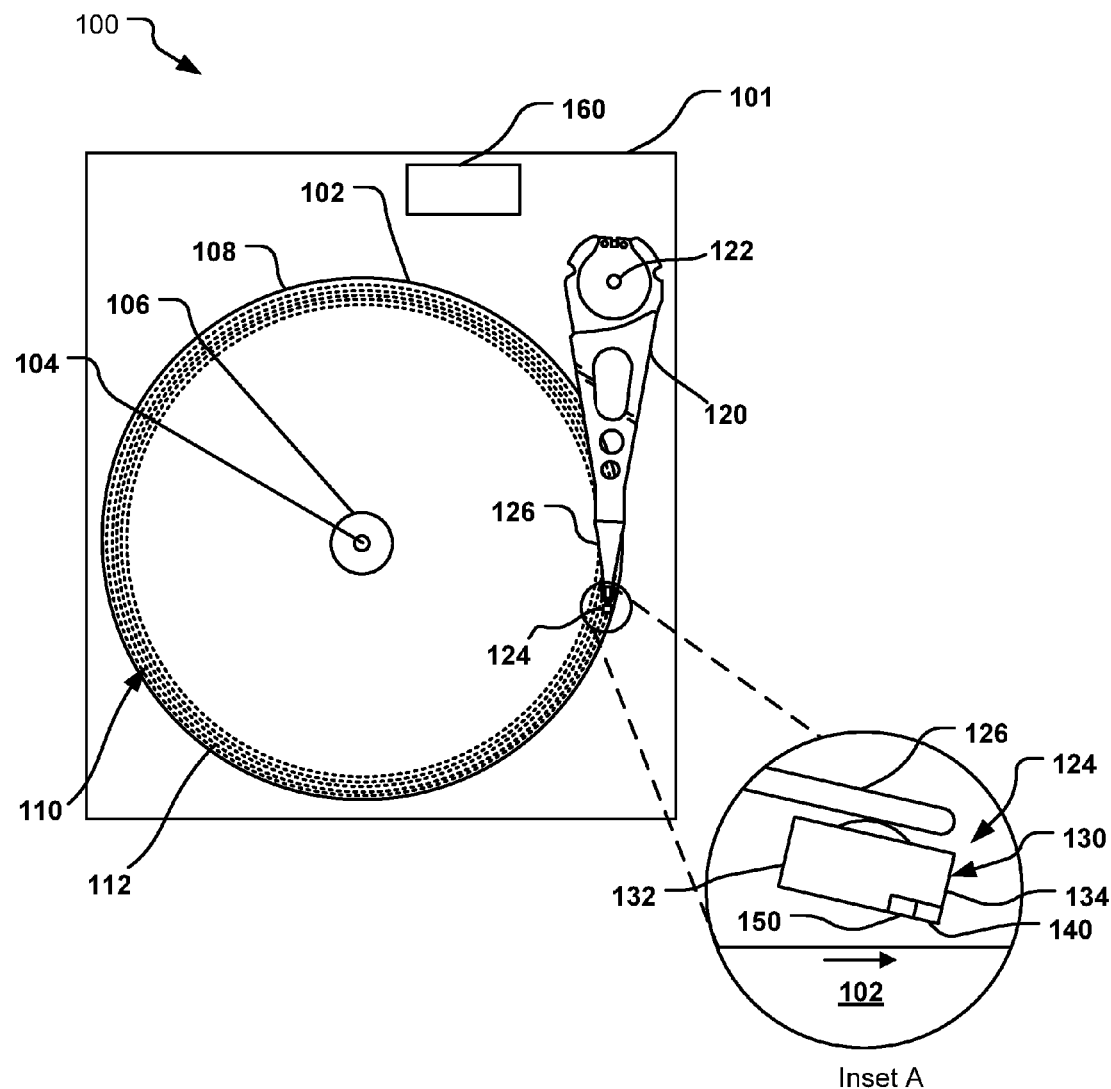

FIG. 1 illustrates a top view of an example data storage assembly 100 including a write head disclosed herein. The data storage assembly 100 includes an enclosure (e.g., case) 101 having a disc 102, which rotates about a spindle center or a disc axis of rotation 104 during operation. The disc 102 includes an inner diameter 106 and an outer diameter 108 between which are a number of concentric data tracks 110, illustrated by dashed lines. The data tracks 110 are substantially circular and are made up of regularly spaced bits 112, indicated as dots or ovals on the disc 102. A typical data track 110 has a cross-track dimension (width) of about 70-100 nm, and a typical bit 112 occupies the width of the track 110 and has a down-track dimension of about 13-20 nm, thus, an overall area of about 910-2,000 $nm^2$. It should be understood, however, that the described technology may be employed with other types of storage media, including continuous magnetic media, discrete track (DT) media, etc.

Information is written to and read from the bits 112 on the disc 102 in different data tracks 110. An actuator assembly 120 having an actuator axis of rotation 122 supports a transducer or slider 124 via a head-gimbal-assembly (HGA) 126 at the distal end of the actuator assembly 120. The slider 124 flies in close proximity above the surface of the disc 102 during disc operation. The actuator assembly 120 rotates during a seek operation about the actuator axis of rotation 122 positioned adjacent to the disc 102. The seek operation positions the slider 124 over a target data track of the data tracks 110.

An enlarged view in Inset A illustrates an expanded, schematic and simplified side view of the slider 124 shown supported by the HGA 126 over the disc 102. The slider 124 has a slider body 130 having a leading edge 132 and a trailing edge 134 with a write head 140 and a read head 150 proximate the trailing edge 134; the surface of the slider 124 facing the disc 102 is an air bearing surface (ABS). The slider 124 is shown "flying" over the disc 102, with a spacing between the ABS and the disc 102, of e.g., of 0.5 to 1.5 nm.

During use of some configurations of sliders 124, magnetic domain walls (DWs), which are a disturbance in the magnetization, form in the write head 140, particularly in the head shields. These DWs can result in a highly non-uniform magnetic flux even in the magnetic media, resulting in sporadic and inconsistent data writing to the disc 102. The present disclosure uses a magnetic stray field originating from inside the enclosure 101 to selectively impact the write head 140, with the purpose of aligning the magnetization uniformly in the cross-track direction of the head 140. In FIG. 1, a magnetic field source 160 is shown in the enclosure 101, positioned at a location to allow the actuator assembly 120 to rotate about the axis 122 to bring the slider 124 in sufficiently close proximity to the magnetic field source 160.

Figure 2A:
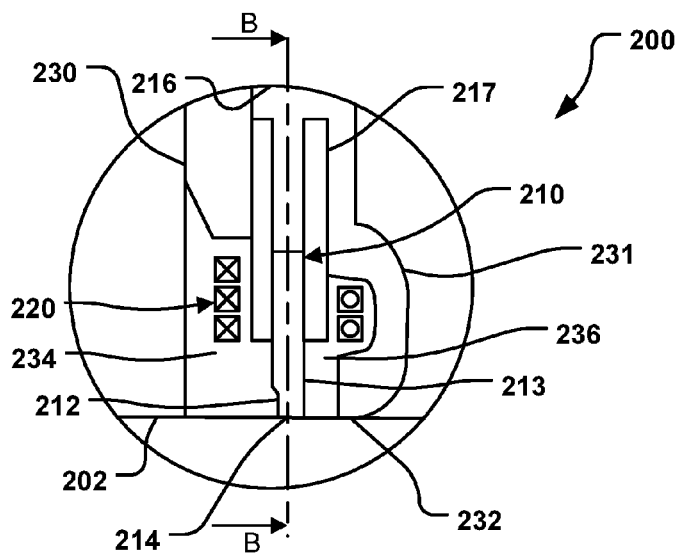
Figure 2B:
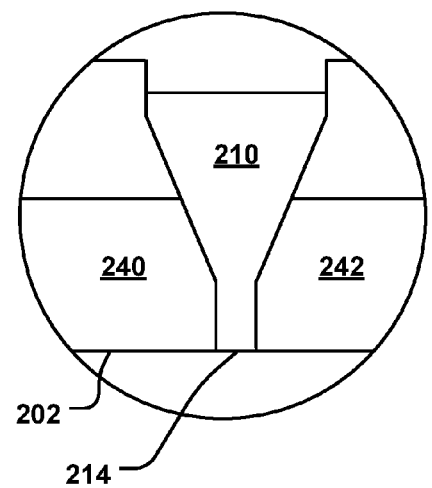
Figure 2C:
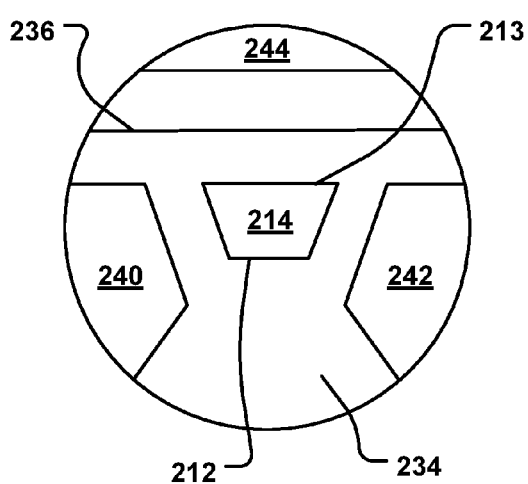

FIGS. 2A, 2B and 2C illustrate a more detailed view of a write head, such as the write head 140 from FIG. 1. It should be understood that this is only one particular write head and that numerous alternate designs of write heads exist. In addition to this example write head, others of the alternate write heads have shields that can be reset by the methodology described herein.

In FIG. 2A, a write head 200 has an air bearing surface (ABS) 202, and a write pole or write paddle 210 having a leading edge side 212 and a trailing edge side 213. The write pole 210 has a pole tip 214 proximate the ABS 202 and a back edge (not called out) opposite pole tip 214. In this particular implementation, on the leading edge side 212 of the write pole 210 is a leading yoke 216 recessed from the pole tip 214, and on the trailing edge side 213 is a trailing yoke 217; other implementations of write heads may have only one yoke.

A coil structure 220 is present around the write pole 210 and the yokes 216, 217. The write head 200 also has a first return pole (RP1) 230 on the leading edge side 212 of the pole 210 and a second return pole (RP2) 231 on the trailing edge side 213 of pole 210. The RP2 231 includes a front shield 232 extending towards the write pole 210 at the ABS 202. Surrounding the coil structure 220, the yokes 216, 217 and the write pole 210 is electrically and magnetically insulating material 234, 236 (e.g., $Al_2O_3$).

As a result of a current flowing through the coil structure 220, a magnetic flux density is generated in the write pole 210 through to the front shield 232. The direction of the current in the coil structure 220 is selected such that the magnetic flux density is directed towards the ABS 202. Such magnetic flux density through the ABS 202 (particularly the write pole 210 and top 214) and into the magnetic media is used for recording (writing) data on the media (e.g., the disc 102 of FIG. 1).

Another view of the write pole 210 and the pole tip 214, in relation to the ABS 202, is seen in FIG. 2B. The view of FIG. 2B is referred to as a 'top down' view of the write pole 210, where the leading side of the write pole 210 is out of the page and the trailing side of the write pole 210 is into the page. Also seen in FIG. 2B are side shields 240, 242. The side shields 240, 242 confine the magnetic flux density to the write pole 210 in the cross-track direction and improve cross-track field gradient.

A view of the pole tip 214, as seen from the ABS, is in FIG. 2C, where the side shields 240, 242 and the insulating material 234, 236 are also seen. A trailing shield 244 is also seen in FIG. 2C. In this particular implementation, the shape of the pole tip 214 is trapezoidal, with the leading side edge 212 shorter than the trailing side edge 213.

Certain long range (e.g., about 2 micrometers away from the pole tip 214 at the ABS 202) erasure modes correlate with DW formation in the trailing shield 244 or the side shields 240, 242. The location of a DW in one of the shields 240, 242, 244 is somewhat random and may shift during the operation of the disc drive. Additionally, a DW might be created or removed (annihilated) during the data storage assembly operation, resulting in drastic variations in erasure, so called "changer" behavior.

Additionally it is possible that a DW could be created in a return pole (e.g., RP1 230 or RP2 231), leading shield or reader shield, with the negative effects similar to the ones for the shields 240, 242, 244 described above.

Figure 3:
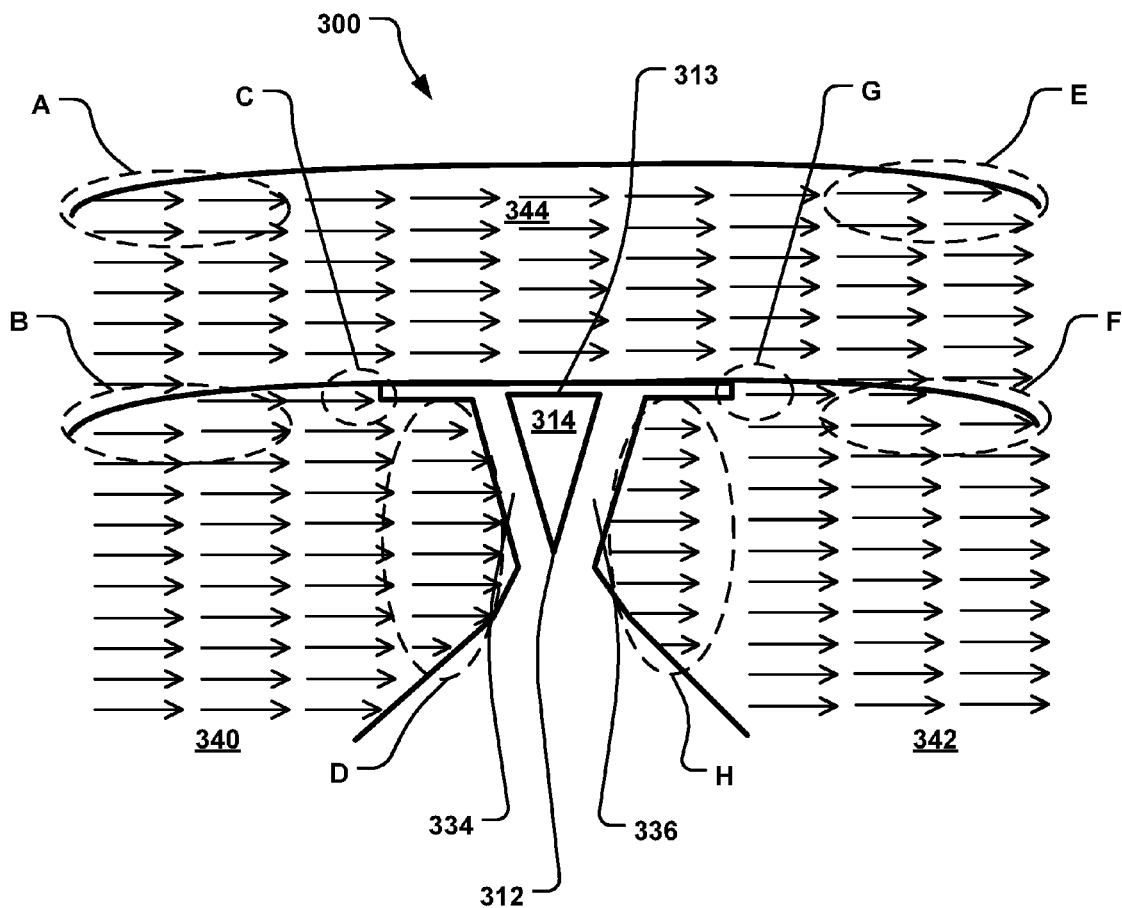
FIG. 3 is a schematic ABS view of an example write head showing potential magnetization orientations in the various shields.

FIG. 3 provides an example of various locations (A, B, C, D, E, F, G, H) where DW may form in write head shields. Similar to the view in FIG. 2C, FIG. 3 shows an ABS view of a write head 300 having a pole tip 314 (in this implementation, having a triangular shape), having a leading side (point) 312 and a trailing side 313. Side shields 340, 342, which confine the magnetic flux density to the write pole in the cross-track direction and improve cross-track field gradient, a trailing shield 344, and insulating material 334, 336 are also seen.

When the write head (e.g., write head 300) is exposed to a high external set field, the resulting internal magnetization is desired to be in a uniform direction, such as the one shown in FIG. 3. However, such uniform magnetization does not constitute a natural energy minimum state in the absence of the external field; thus, various locations, particularly locations C and G, are prone to highly non-uniform magnetization due to rapid changes in the shield topology, which might act as a seed for the DW creation. As indicated above, a DW can detrimentally affect the efficiency and accuracy of the write head 300.

Figure 4:
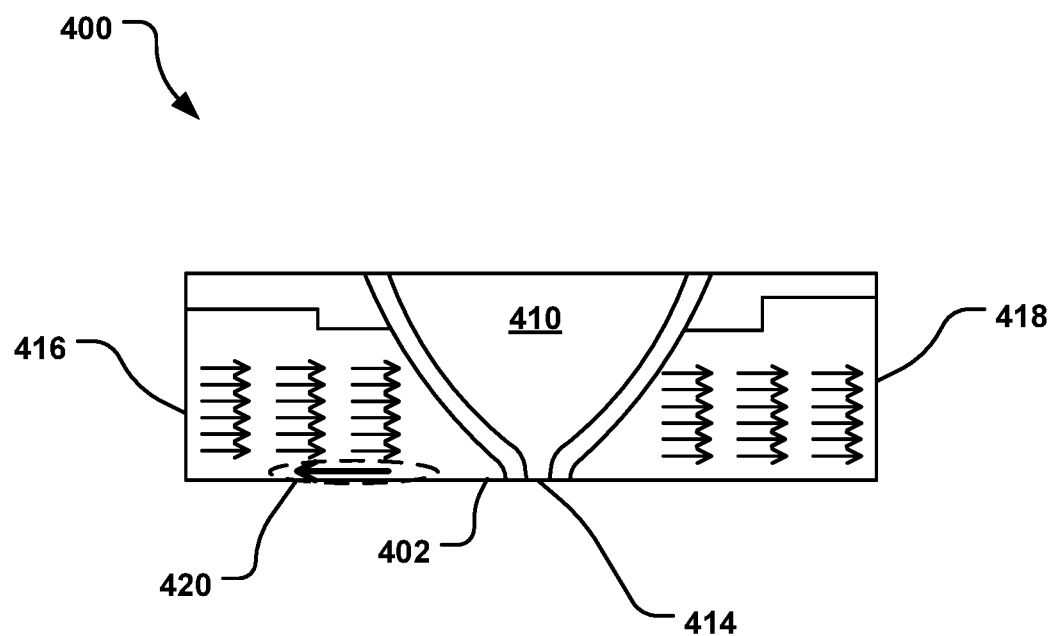
FIG. 4 is a schematic cross-sectional top view of a write head with a magnetic domain in the left side shield.

FIG. 4 shows a top view of a write head 400, particularly showing a write pole 410 and a write pole tip 414 at the ABS 402. On either side of the write pole 410 is a side shield, identified as a left side shield 416 and a right side shield 418; the desired magnetization of both side shields 416, 418 is illustrated in the shields 416, 418. However, present in the left side shield 416 is a magnetic domain wall (DW) 420, which is a disturbance in the magnetization of the shield 416; in this particular implementation, the magnetization direction of the DW 420 is antiparallel to the desired magnetization of the shield 416, although in other implementations the DW magnetization direction may be at a different angle to the desired magnetization of the shield 416.

Magnetization in the shields 416, 418 generally tries to align itself along the boundaries of the side shields 416, 418. However, as the equilibrium state is topologically very far away from a state that is completely uniformly magnetized, and the latter state also has very high energy, there is a significant probability of a portion of the shield reverting or flipping to a high energy equilibrium state This high energy equilibrium state can form a DW.

In order to remove or otherwise mitigate a DW, the field needs to be sufficiently high to destroy the existing DW, but not so high that it completely uniformly magnetizes areas such as locations C and G, thus putting that magnetization into highly unstable, high energy states, which can result in creation of a new DW.

An effective solution is therefore to use magnetic field(s) with varied amplitude, for example, a decaying and/or oscillating magnetic field.

Provided herein are various methodologies (e.g., methods and devices) that use a magnetic field produced within the data storage assembly to selectively affect the magnetization in the shield material, with the purpose of aligning magnetization uniformly in the cross-track direction and thus remove or mitigate any DWs.

Prior to the methodologies of this disclosure, a slider (having a write head and a read head) is placed in or on a high power magnet in order to set its magnetization in the cross-track direction prior to being installed or otherwise incorporated into a data storage assembly. While the exact effect of this procedure strongly depends on the head design, the expected outcome is better, more stable performance, reduction of reader noise and reader instabilities due to magnetic domain walls (DW) in shield(s), and reduction of erasure due to elimination of DW in (trailing or side) shields in close proximity to the write pole. The prior setting procedure includes application of a very large field (e.g., 5 KOe-15 KOe, e.g., about 8.5 KOe) with an unspecified time dependence. After the field is turned off the time dependent decay of the field is simply given by the properties of the setting device's circuits.

Conversely, the present disclosure utilizes a smaller magnetic field, which can include an oscillating magnetic field (oscillating in polarity), in some implementations no greater than 1500 Oe (1.5 KOe) and in other implementations no greater than 1000 Oe (1 KOe), produced within the data storage assembly to remove (destroy) DW in the shields; in some implementations, the magnetic field decreases over time, thus being a reducing or decaying magnetic field. Prior to oscillating the field, a large field (e.g., greater than 1000 Oe or greater than 1500 Oe) can be used to reset the hardest portion(s) of the write head. It can also include a unipolar (constant polarity) field of monotonically decaying amplitude or consequent application of fields with varied amplitude, or any combination of thereof. One particular implementation utilizes multiple sequential applications of magnetic fields with decaying amplitude; such an implementation can utilize, e.g., two episodes (for example 10,000 Oe or 10 KOe followed by 500 Oe).

Figure 5:
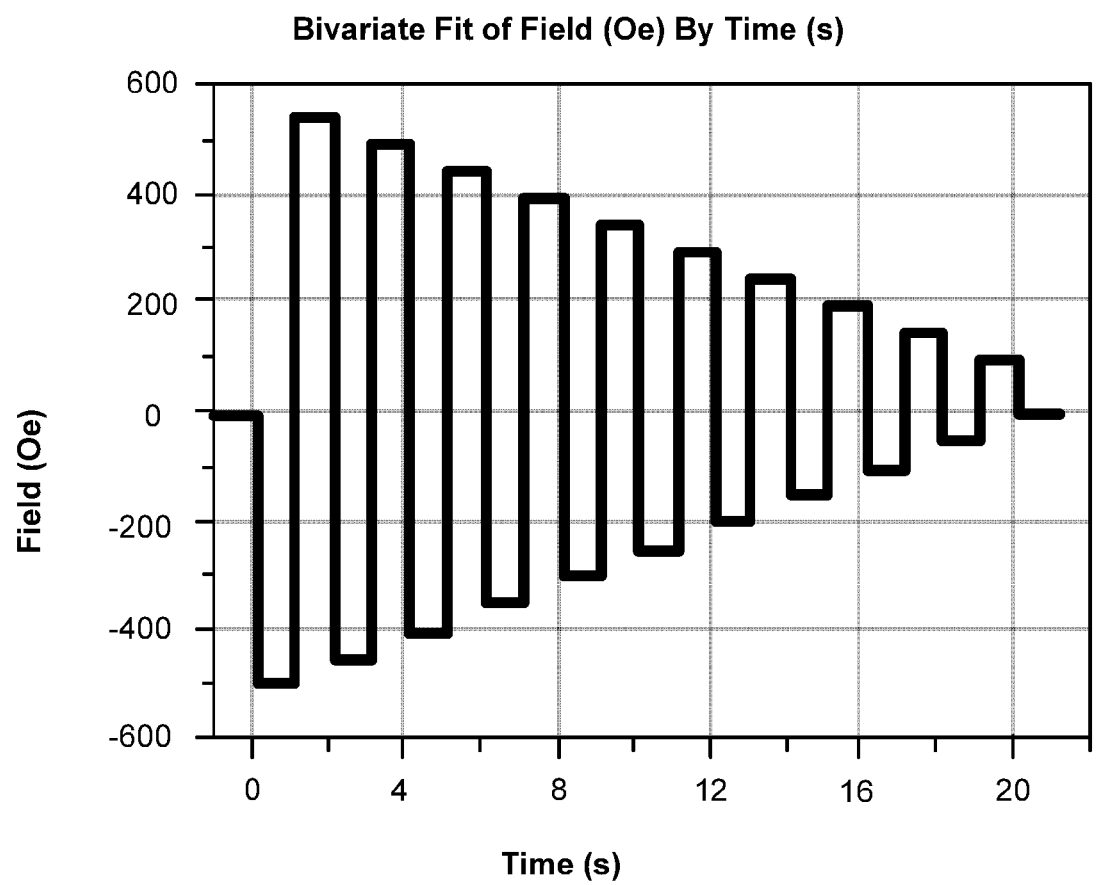
FIG. 5 is a graphical representation of an example of a magnetic field applied to the write head to remove a magnetic domain from a shield.

FIG. 5 shows an example of a decaying oscillating magnetic field that can be used to remove or mitigate any DWs. As can be seen, the applied magnetic field oscillates between positive (+) and negative (−) and decreases over time. The highest field (either positive or negative) is at least 100 Oe or at least 200 Oe, in some implementations at least 300 Oe, or at least 400 Oe, and even at least 500 Oe; the highest field (either positive or negative is no greater than 1500 Oe, and in some implementations no greater than 1000 Oe. The field of FIG. 5 can be referred to as a 'biased degauss waveform', a decaying field with alternating polarities; in some implementations, the decaying field is combined with a constant bias field.

The oscillation may be defined as 'steps' (as in FIG. 5), or may be defined by a smooth curve, such as a sine or cosine curve. The frequency between adjacent peaks (either a positive peak to a positive peak, or a negative peak to a negative peak) is at least 0.1 seconds, at least 0.5 second, in some implementations at least 1 second and in other implementations at least 2 seconds; although a constant frequency is typical, in some implementations the frequency may vary. The amplitude decrease between adjacent peaks may be, e.g., 50 Oe, 100 Oe, 20 Oe or 25 Oe; typically, the amplitude decrease is linear, although in some implementations it may be nonlinear, such as exponential. For stepped curves, the time duration at the amplitude peak is at least 0.1 second or at least 0.25 second, in some implementations at least 0.5 second, in other implementations at least 0.7 second, and in other implementations at least 1 second. The total oscillating field may be on for, e.g., at least 10 seconds, at least 15 seconds, at least 20 seconds, or at least 30 seconds; typically, the field is on for no more than 1 minute. In some embodiments, the slider and/or write head and magnetic field source are moved in close proximity to each other, rather than turning the oscillating field source on and off.

In the particular example of FIG. 5, the positive (+) peaks are larger than the negative (−) peaks, thus the average field is positive (+). The particular shown example has an initial peak field of about −500 Oe, then about +550 Oe, then about −450 Oe, then about +500 Oe, then about −400 Oe, then about +450 Oe, etc. In other implementations, the average field is negative (−) or neutral (zero). It is noted that in FIG. 5, the initial field is negative (−) (about −500 Oe), however it should be understood that the initial field may be positive (+).

The magnetic field used to set the magnetization of the write head can be either oscillating in polarity or not, and optimized for the purpose of obtaining a specific magnetic state. Optimization can include, e.g., the time dependence with exponential, linear or other decay as a function of time, to zero field or relatively small (hundreds of Oe) value; repeated application of magnetic fields with different amplitude, e.g., starting with the largest and ending with the smallest; use of biased degauss waveform, in which the decaying field with alternating polarities is combined with a constant bias field; and, the temperature at or near the write head can be adjusted to further enhance the transition to the desired state. The decay, either oscillating or not, is non-random, e.g., linear, exponential, etc.

As discussed above, a DW may be formed when a shield has a very high energy, and the magnetization direction flips from its equilibrium state to a high energy equilibrium state. By oscillating the applied magnetic field simultaneously with its decrease, the extra energy is slowly decreased through damping, while the continuous presence of the external magnetic field inhibits the system from transitioning into high-energy state with non-uniform magnetization and/or DW in the shields.

Figure 6:
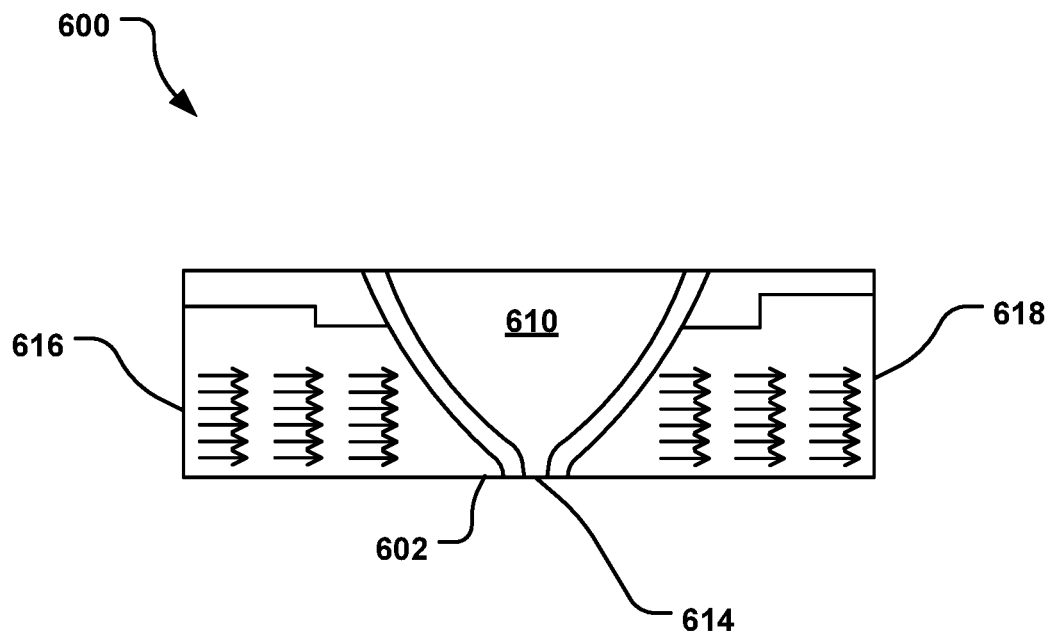
FIG. 6 is a schematic cross-sectional top view of a write head without a magnetic domain in the left side shield.

FIG. 6 shows a view of a write head 600, similar to that of FIG. 4, after having been exposed to a decaying oscillating magnetic field. FIG. 6 shows the write head 400, having a write pole 610 and a write pole tip 614 at the ABS 602, and a left side shield 616 and a right side shield 618. The magnetization of both side shields 416, 418 is unidirectional, with no disturbance present.

Figure 7:
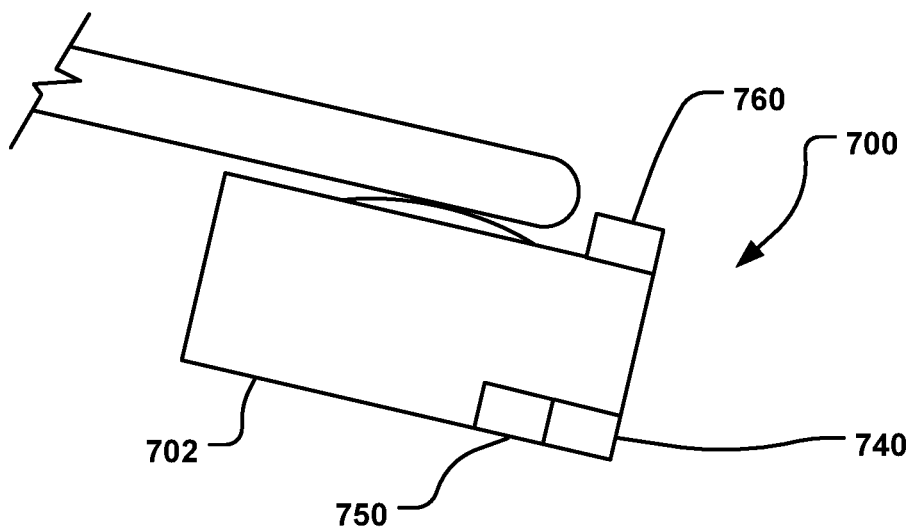
FIG. 7 is a schematic and simplified side view of a slider with a write head and an example magnetic field generator.
Figure 8:
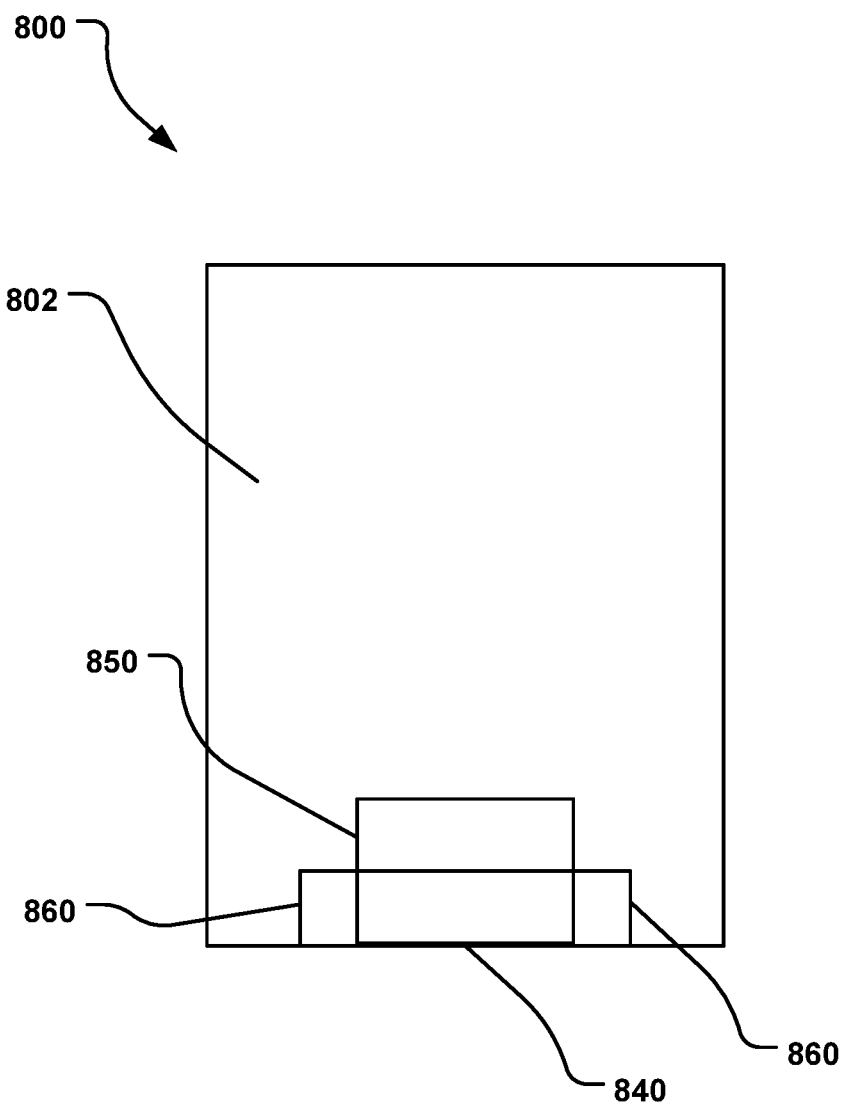
FIG. 8 is a schematic and simplified ABS view of a slider with a write head and another example magnetic field generator.

The decaying oscillating magnetic field may be provided by any suitable feature present within the data storage assembly that can produce the desired decaying oscillating field. For example, in FIG. 1 a magnetic field source 160 is shown in the enclosure 101, positioned at a location to allow actuator assembly 120 to rotate about axis 122 to bring the slider 124 in sufficiently close proximity to the magnetic field source 160. FIG. 7 shows another example, with a magnetic field source 760 positioned on the surface of a slider 700, opposite the ABS 702 that has a write head 740 and a read head 750. FIG. 8 shows yet another example, with a magnetic field source 860 positioned on the ABS 802 of a slider 800, on each side of a write head 850. In some implementations, the magnetic field source 860 may additional be on each side of a read head 840.

The magnetic field source 160, 760, 860 may be any magnetic field source that can provide a magnetic field of switching polarity (+ and −) and that can be controlled. In some implementations, two individual sources may be used, e.g., one for the positive field and one for the negative field. Examples of suitable magnetic field sources include permanent magnet(s), an external coiled wire or a wire inserted into the write head or slider body, as well as various external devices, including those using superconducting materials.

The resetting of the shield(s) may be done as the data storage assembly is operating (e.g., reading or writing data) or with the assembly in a 'maintenance mode.' In such a maintenance mode, which may between read/write operations or e.g., scheduled during known down times, such as the middle of the night, the assembly can perform self-diagnostics to determine the presence of any magnetic domain wall and then initiate a reset process.

Figure 9:
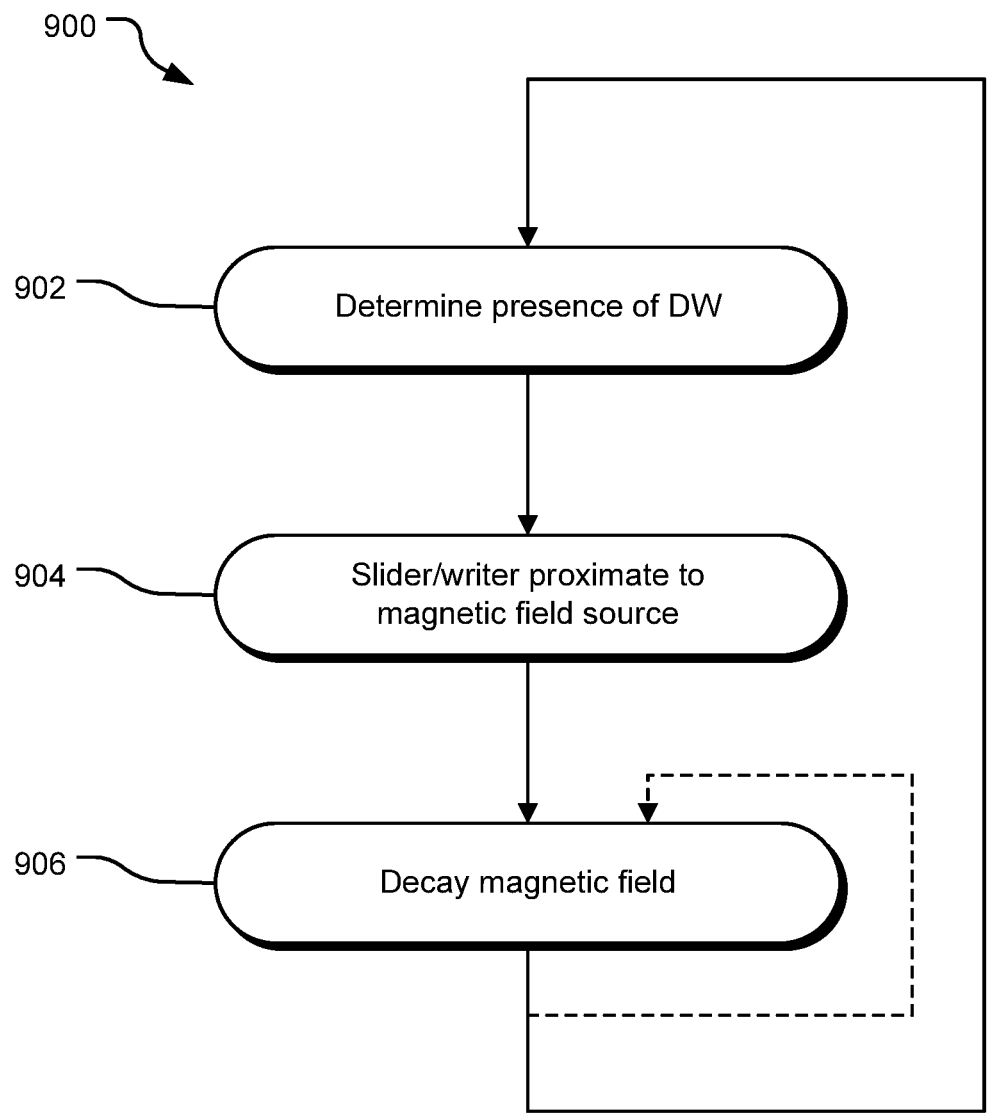
FIG. 9 is a step-wise flow chart of an example method for removing a domain wall.

An example reset process 900 for a writer is illustrated step-wise in FIG. 9; the writer or write head is present on a slider incorporated into a data storage assembly. In step 902, the presence of a DW is determined; the DW may be, e.g., in a trailing shield, left side shield or right side shield. Step 902 may be done while the data storage assembly is operating (e.g., reading or writing data) or with the assembly in a 'maintenance mode.' If a DW is present, which in some cases can be determined by detecting the instability of reader signal or particular distortion in the written part, in step 904, the slider (write head) is brought into operational proximity of a magnetic field source that is present in the data storage assembly. In step 906, the magnetic field source provides a decaying magnetic field. It is noted that steps 904 and 906 in order, in reversed order, or simultaneously. Step 906 may be repeated as needed to confirm the DW has been reset. After the DW has been reset, in step 906 the data storage assembly resumes operation, after which the process 900 can be initiated again, periodically.

Figure 10:
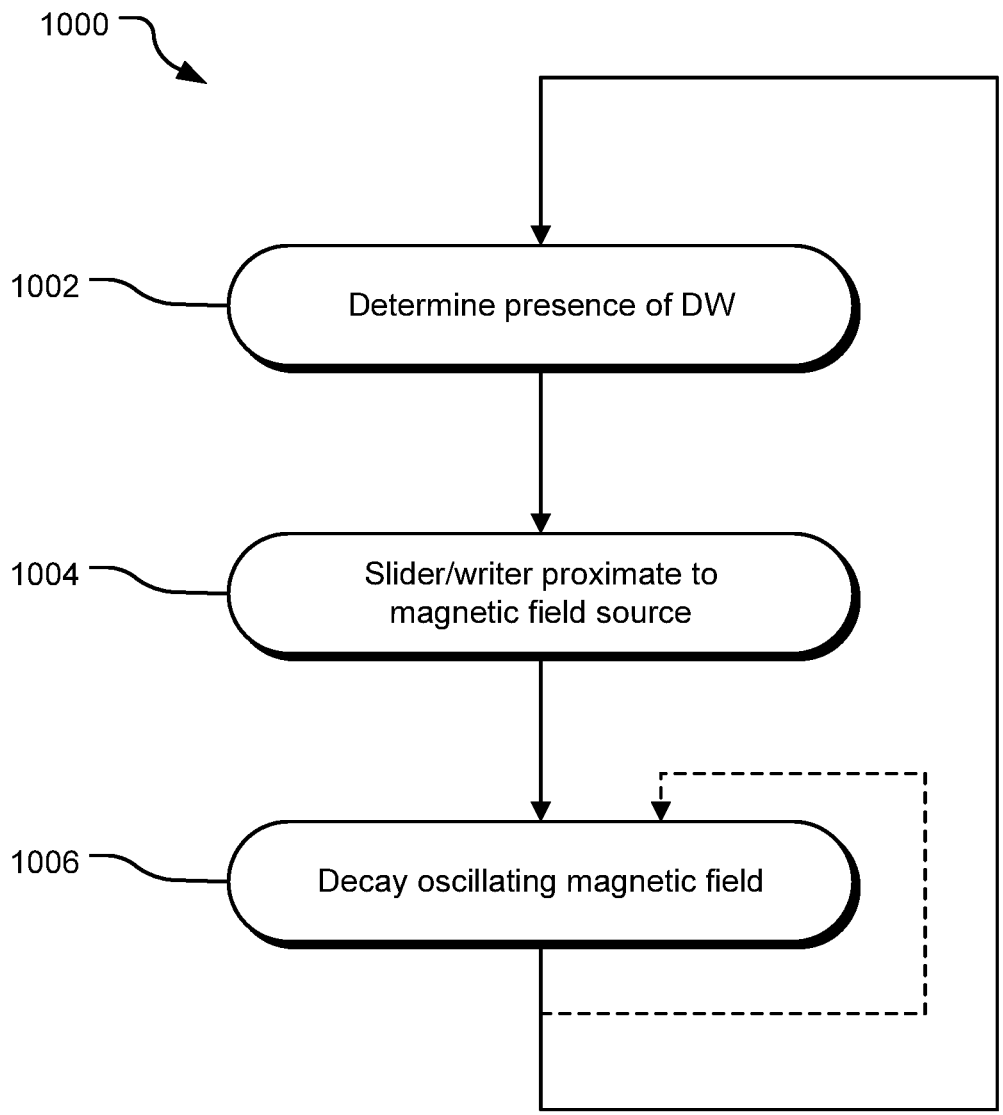
FIG. 10 is a step-wise flow chart of another example method for removing a domain wall.

Another example reset process 1000 for a writer is illustrated step-wise in FIG. 10; the writer or write head is present on a slider incorporated into a data storage assembly. In step 1002, the writer determines the presence of a DW; the DW may be, e.g., in a trailing shield, left side shield or right side shield. Step 1002 may be done while the data storage assembly is operating (e.g., reading or writing data) or with the assembly in a 'maintenance mode.' If a DW is present, which in some cases can be determined by detecting the instability of reader signal or particular distortion in the written part, in step 1004, the slider (write head) is brought into operational proximity of a magnetic field source that is present in the data storage assembly. In step 1006, the magnetic field source provides a decaying oscillating magnetic field. It is noted that steps 1004 and 1006 in order, in reversed order, or simultaneously. Step 1006 may be repeated as needed to confirm the DW has been reset. After the DW has been reset, in step 1006 the data storage assembly resumes operation, after which the process 1000 can be initiated again, periodically.

Various implementations of resetting a DW in a writer shield, by using a reducingly or decaying oscillating magnetic field, have been described above. With such methodology, the magnetization in writer shields can be reset to be unidirectional, improving writer performance by, e.g., reduction of inadvertent or undesired erasure. Obtaining a consistent magnetic state (e.g., unidirectional, with no DW) leads to improved erasure (or, lack of erasure), both or either during the writer operation (side track erasure) and when the writer is turned off (erase after write).

The above specification provides a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of removing a magnetic domain from a slider structure in a data storage assembly, the method comprising:
   passing the slider structure in close proximity to a non-randomly decaying magnetic field of at least 100 Oe and no more than 1500 Oe originating from within the storage assembly.

2. The method of claim 1 comprising passing the slider structure in close proximity to a decaying magnetic field of at least 200 Oe and no more than 1500 Oe originating from within the data storage assembly.

3. The method of claim 1, wherein the decaying magnetic field decays in a step-wise manner.

4. The method of claim 3, wherein the decaying magnetic field is a decaying oscillating polarity magnetic field.

5. The method of claim 4, wherein a duration at a stepped peak is at least 0.25 second.

6. The method of claim 4, wherein the decaying oscillating polarity magnetic field decays linearly or exponentially.

7. The method of claim 6, wherein the decaying oscillating polarity magnetic field decreases by at least 50 Oe between adjacent peaks.

8. The method of claim 4, wherein the decaying oscillating polarity magnetic field comprises at least two superimposed magnetic fields.

9. The method of claim 1, wherein the slider structure is exposed to the decaying magnetic field at least 10 seconds and no more than 1 minute.

10. A method of removing a magnetic domain from a shield of a write head, the method comprising:
    exposing the write head to a magnetic field oscillating between at least +100 Oe and −100 Oe and no more than +1500 Oe and −1500 Oe.

11. The method of claim 10, wherein the oscillating magnetic field decays over time.

12. The method of claim 11, wherein the decaying oscillating magnetic field decreases by at least 50 Oe between adjacent peaks.

13. The method of claim 11, wherein the write sensor is exposed to the oscillating magnetic field at least 10 seconds and no more than 1 minute.

14. The method of claim Ti, wherein the magnetic field oscillates smoothly.

15. The method of claim 11, wherein the magnetic field oscillates step-wise.

16. The method of claim 15, wherein a frequency of adjacent step peaks is at least 0.5 second.

17. The method of claim 11, wherein the write sensor is in a data storage assembly and the magnetic field originates from within the data storage assembly.

18. A magnetic data storage assembly comprising:
    an enclosure;
    a slider in the enclosure, the slider comprising a write head; and
    a magnetic field source in the enclosure, the source configured to provide a decaying magnetic field oscillating between at least +100 Oe and −100 Oe and no more than +1500 Oe and −1500 Oe.

19. The assembly of claim 18, wherein the magnetic field source is present on the slider.

20. The assembly of claim 18, wherein the magnetic field source is a permanent magnet.

* * * * *